United States Patent [19] [11] 3,954,379
Klocke [45] May 4, 1976

[54] APPARATUS FOR CONTINUOUS MOLDING OF REINFORCED RESIN PROFILE MEMBERS

[75] Inventor: Otto Klocke, Hunxe-Bucholtwelmen, Germany

[73] Assignee: Grillo-Werke Aktiengesellschaft, Duisburg-Hamborn, Germany

[22] Filed: June 21, 1974

[21] Appl. No.: 482,706

Related U.S. Application Data

[63] Continuation-in-part of Ser. No. 210,827, Dec. 22, 1971, abandoned.

[30] Foreign Application Priority Data
Dec. 22, 1970 Germany............................ 2063169
May 3, 1971 Germany............................ 2121643

[52] U.S. Cl.................................. 425/505; 425/516; 425/114; 156/180
[51] Int. Cl.².................... B22B 21/52; B22B 21/74
[58] Field of Search .......... 425/113, 114, 505, 516; 156/441, 180

[56] References Cited
UNITED STATES PATENTS

| | | |
|---|---|---|
| 1,965,844 | 7/1934 | Loomis ................. 425/114 |
| 2,863,171 | 12/1958 | Von Bergen ........................ 425/114 |
| 3,283,050 | 11/1966 | Boggs............................ 425/114 |
| 3,303,251 | 2/1967 | Heider et al. ................. 425/114 |
| 3,534,437 | 10/1970 | Quackenbush ................. 425/114 X |
| 3,582,417 | 6/1971 | Plate et al............................ 425/114 |
| 3,646,186 | 2/1972 | Hoger ............................ 425/114 X |
| 3,706,216 | 12/1972 | Weingarten..................... 425/114 X |
| 3,895,896 | 7/1975 | White et al. ..................... 425/114 X |
| 3,897,187 | 7/1975 | Mole................................ 425/114 X |

FOREIGN PATENTS OR APPLICATIONS

| | | |
|---|---|---|
| 384,196 | 3/1961 | Switzerland |
| 1,168,627 | 4/1964 | Germany |
| 1,176,794 | 1/1970 | United Kingdom |
| 1,206,946 | 9/1970 | United Kingdom |

*Primary Examiner*—Ronald J. Shore
*Attorney, Agent, or Firm*—John C. Smith, Jr.

[57] ABSTRACT

An apparatus is provided for the continuous molding of hardened resin construction members reinforced with fiber material precisely positioned and arranged during the continuous molding process. The reinforcing fiber material in the form of continuous rovings, woven webs, fabric, fleeces, etc. and having a sizing is fed into an elongated hollow molding duct where the material is first compressed and heated to bond the fibers together at their points of contact to form a grid structure. Synthetic resin is injected into the duct intermediate its ends to impregnate the grid structure and be shaped by the molding duct with the reinforcing fibers contained within the resin. The synthetic resin is then hardened by heating as the shaped resin passes further along the duct forming the finished construction or profile member. The profile member produced by this apparatus may include longitudinally extending openings reinforced by circumferentially arranged reinforcing fibers so that the longitudinal openings can withstand excessive radial stress exerted by expandable fasteners used to construct articles from the profile members.

9 Claims, 18 Drawing Figures

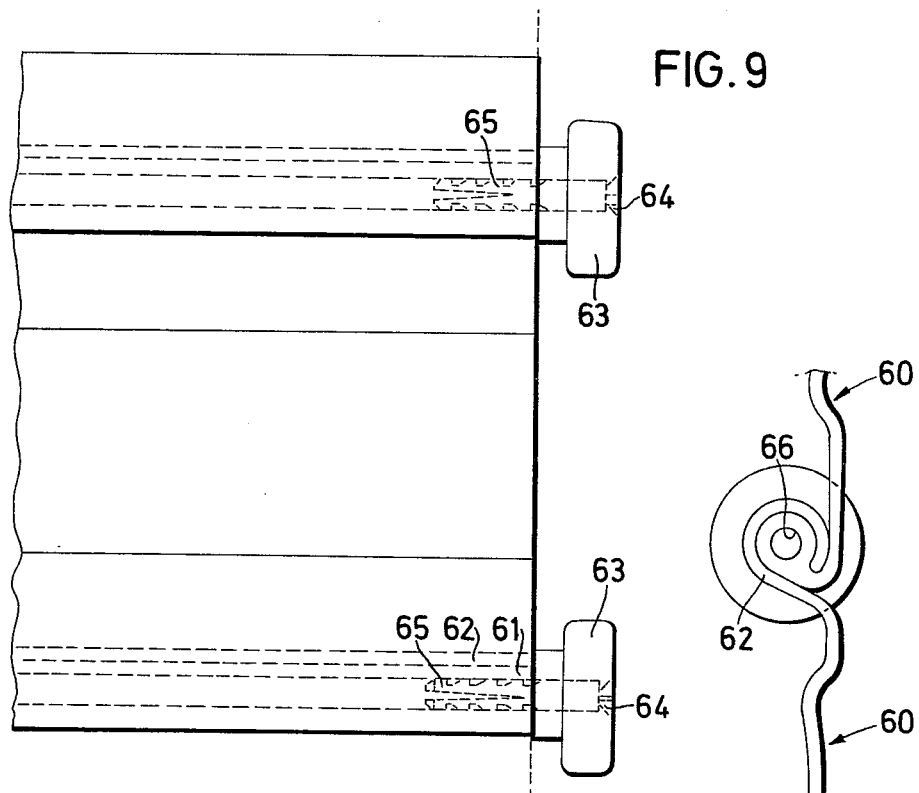
FIG. 9
FIG. 10
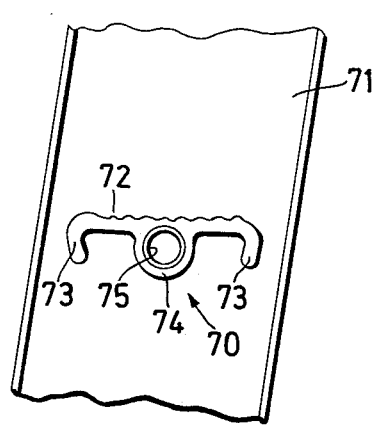
FIG. 11

APPARATUS FOR CONTINUOUS MOLDING OF REINFORCED RESIN PROFILE MEMBERS

This is a continuation-in-part of my copending application Ser. No. 210,827 filed Dec. 22, 1971, now abandoned, which is incorporated by reference in its entirety.

BACKGROUND OF THE INVENTION

This invention relates to an apparatus for the continuous molding of structural profile or section members made from hardened synthetic resins. The members are reinforced with fibrous material embedded within the profile member during the molding process. The profile member is shaped as desired by drawing through a shaped molding duct while hardening takes place under heat.

In the past, numerous problems and disadvantages have been encountered in molding processes such as this. In horizontal working methods, it has been near impossible to produce section or profile members and especially hollow profile members with a complicated cross-section. In addition, it has been difficult to introduce in a satisfactory manner fiber lengths and fabric or mat strips running from an impregnation bath and guided by a centrally arranged mandrel. Even with complicated open profile members, considerable difficulties have been experienced in the feeding of the impregnated fiber lengths and webs so that a uniform distribution of the reinforcing material is present in the profile cross-section.

In the prior art it is also known to supply resin under pressure to the fiber material for the purpose of wetting. However, in the past this wetting operation has taken place before the material has reached the shaping section of the mold. Thus, the fiber material has a dimension which is usually greater than the overall cross-section of the profile member to be produced. This impregnation at the entrance to the mold does not readily lend itself or guarantee that the fiber material will flow through the mold with the required distribution over the entire cross-section.

It is true that when using the continuous mold in the vertical position, some of these difficulties are reduced by the fact that the impregnating bath lies immediately above the mold inlet and the reinforcing material can be draped into the mold in their relative positions. A squeezing action or flowing movement, however, remains as the fibers enter the throat of the mold with a partially uncontrollable change in the fiber arrangement due to a back pressure generated by excess resin contained on the fiber material. In addition, it has been found that a heat transfer due to the chemical exothermic process in the resin is conducted upwardly into the impregnating bath causing possible premature gelling and hardening.

In the prior art molding processes, considerable sliding friction has been experienced between the walls of the shaped molding duct and the continuous length of profile member as the resin becomes hard. For this reason, the operating speed of the molding process and the length of the molding duct are limited since the withdrawal forces cannot exceed tthe reinforced material strength of the finished profile member. A cooling means placed at the inlet of the mold has been attempted to limit the excess temperatures that can be expected in the resin. This cooling section, however, reduces the length of the mold duct available for hardening of the laminate. Attempts to compensate for these effects by the use of highly reactive resins or large additions of reactive media to the resin has been found to be prohibitive. By attempting to reduce the hardening time for the resin, spontaneous hardening can result producing a brittle product or one which experiences the formation of cracks because of shrinkage stresses occurring in the mold.

Another process for the continuous molding of fiber reinforced profiles is known wherein the fibers are fed horizontally from a feeding device and are passed through a preliminary cooling zone whereafter there occurs in injection of liquid synthetic resin in order to obtain a pre-impregnation of the reinforcing material. In further advance through the molding duct, a second resin injection is performed to fit the profile member with an additional synthetic resin envelope.

In the past, other problems have existed when an attempt has been made to introduce reinforcing windings or coils into the molded profile member. Pre-impregnation of the coil fibers either prior to or at the entrance to the molding duct causes a change in the shape of the winding or coil structure. In addition, this process has produced shifting in the relative position of the coil with respect to the cross-section of the member. Furthermore, the use of woven fabrics and mat strips for this purpose has been found to be undesirable because of the necessity of butting or overlapping these materials in the reinforcing arrangements. These procedures increase the danger of irregular fiber concentrations in the finished product. Where the diameters of the longitudinal openings are intended to be small, the use of resin-impregnated mats or fabrics in the conventional process is impossible.

OBJECTS OF THE INVENTION

One of the main objects of this invention is to provide a process and apparatus for the continuous molding of fiber reinforced hardened resin profile members wherein the fiber reinforcing materials maintain a predetermined distribution over the cross-section of the molded member throughout the continuous length of the member.

Another object of this invention is to produce a fiber reinforced resin profile member in both a simple and efficient operation. A high rate of molding, impractical with previously known apparatus, is provided with this invention.

A further object is to provide a process and apparatus for molding reinforced resin profile members which include one or more circumferentially reinforced longitudinal openings therethrough. These openings are intended to permit a secure and permanent means for assembling the finished members in usable fashion.

Still a further object is to provide a molding process wherein the fibers are impregnated with resin while being drawn through the shaping duct permitting the fibers to be held in proper tension and position during hardening of the molded product.

Another object of the invention is a reinforced resin profile member having at least one circumferentially reinforced longitudinally extending opening therethrough to provide secure and permanent means for assembling a plurality of the members to form a structure.

SUMMARY OF THE INVENTION

The process and apparatus of this invention is directed to the continuous molding of profile members fabricated from hardened synthetic resins reinforced with continuous lengths of fiber materials. Fiber materials which can be used in this invention are continuous length rovings, woven webs, fabric, fleeces and the like, fabricated from glass fibers or the like having heat softenable sizing adhering thereof.

The apparatus includes an elongated shaped molding duct which has an opening extending therethrough shaped in the desired configuration of the finished profile member. The fiber reinforcing material is fed in continuous lengths from spools or reels arranged on a spool suppport-feeding means. The fiber lengths extend from the spools through a guide means such as loops or eyes positioned in front of the inlet of the molding duct and arranged in the desired position for the fiber lengths with respect to the cross-section of the finished profile member.

The molding duct is divided into inlet and outlet sections which are separated by a resin injecting section. The resin injecting section is designed with an internal nozzle corresponding to the final shape and size of the finished profile member. At least a portion of the outlet section continues this shape to provide the form for the profile member while the resin material is hardened.

A preheating means is included in the inlet section of the mold. This heating means can be either formed within the walls of the duct or formed to surround the duct. The dry fiber material having sizing material adhering to the fibers is heated to a temperature close to the polymerization temperature of the resin. The heat causes the sizing material to become tacky and bond the fibers together at their points of contact resulting in an irregular grid structure filled with hollow spaces. Also, by this means, gas or vapors are caused to expand and to be moved from the material prior to impregnation by the resin, and the resin is able to move freely in association with the heated fibers to wet the material and aid in the movement of the gas towards the inlet of the duct. Resin is introduced into the injection nozzle in such a way as to be evenly distributed around the circumference of the duct opening. The incoming resin is preheated to raise the temperature of the resin to a point near the polymerization or hardening temperature. This increase in temperature greatly reduces the viscosity of the resin facilitating flow into the duct cavity and rapid flow along and through the reinforcing fibers. Rearrangement of the fibers during the injection step is avoided by the initial bonding of the tacky sizing.

Another heating means is provided in the outlet section of the molding duct in order to heat the resin in the duct above the hardening or thermosetting temperatures. As the hardened member issues from the output of the duct, it is gripped by a withdrawal means which applies an even and continuous drawing force on the member. If desired, a cooling means may be applied immediately ahead of the hardening heater to control the temperature of the resin entering the hardening section to prevent an excess temperature rise and prevent "combustion phenomena" in the resin.

A saw or other cut-off means is provided downstream from the withdrawal means to sever the continuous profile member into usable lengths. The severed sections can be carried away over a table surface, a roller track or similar devices.

The apparatus described herein permits an equally good operation in both a vertical or horizontal arrangement. Various positions can be used depending upon the desired arrangement of the necessary reinforcing materials and the various advantages the positions have with respect to the automatic transportion and handling of the hardened profile members.

The present invention can be easily adapted to produce profile members which contain longitudinal openings extending therethrough. These openings are convenient and sometimes necessary for the assembly of the members into usable units. A reinforcing coil forming a closed profile is incorporated into the molding article in the position where the opening is desired. Continuous lengths of fiber material are positioned so as to outline the desired opening, and additional fibers are wound around these lengths to form a closed profile arrangement. As the lengths are drawn into the mold, so is the coil, thus positioning the coil and embedding it in the finished member.

A resin insert nozzle which can be of one piece construction or several sections held together between the flanges of the inlet and outlet section of the molding duct is provided in this apparatus. The insert nozzle can be replaced as desired to change the shape of the profile members. Various types of passageways and openings may be provided in the nozzle to assure that the resin is fed evenly around the entire periphery of the mold opening.

The profile members which can be produced by use of this apparatus can be of many shapes and sizes with numerous arrangements for the fiber reinforcement necessary for the intended use of the member. In addition to the possibility of attaching the members by means of expanding fasteners within the longitudinal openings, there is also the possibility of manufacturing hinge-like parts which are engaged by various means such as rivets or fixing elements.

BRIEF DESCRIPTION OF DRAWINGS

Other objects of this invention will appear in the following description and appended claims, reference being made to the accompanying drawings forming a part of the specification wherein all like reference characters designate corresponding parts in the several views.

FIGS. 9 and 10 show an assembly of members produced by this invention which includes a means for interconnecting the edges of the members;

FIG. 11 is a sectional view of the rung of a ladder produced by this invention showing a longitudinal opening under the central portion of the rung member;

DESCRIPTION OF SPECIFIC EMBODIMENTS

Figure 1:
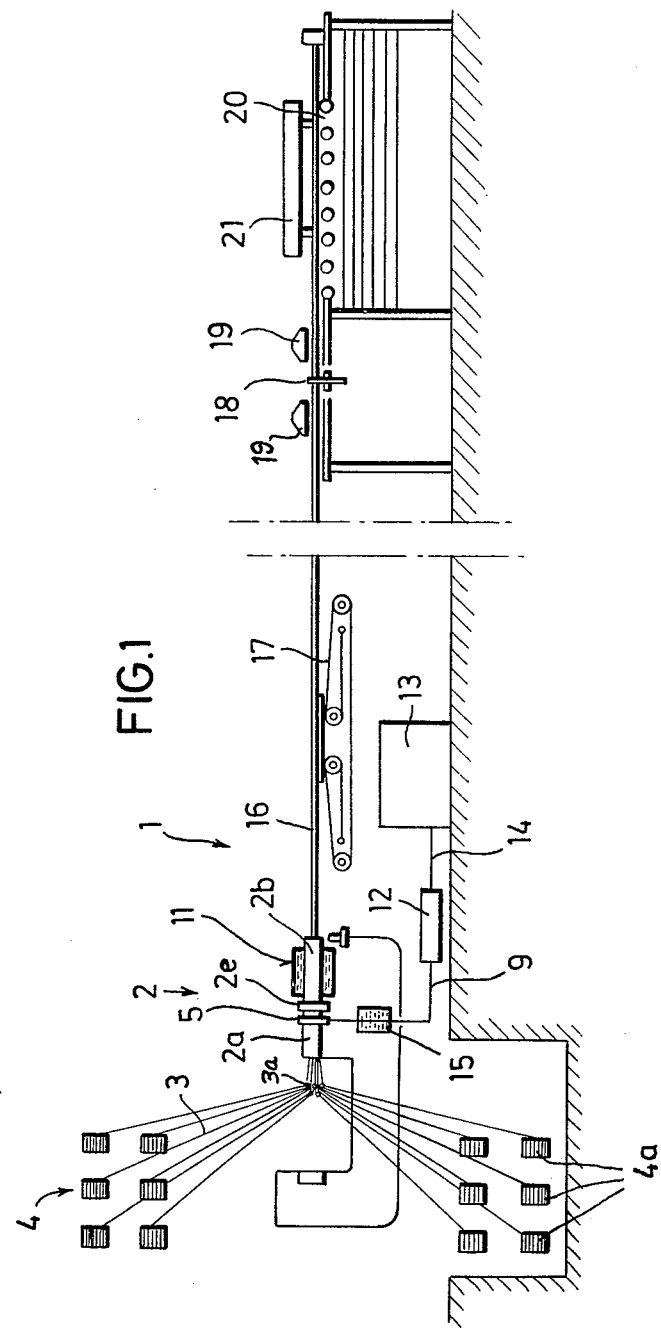
FIG. 1 shows a diagrammatic view of the apparatus of this invention for the continuous production of fiber reinforced hardened resin profile members.
Figure 2:
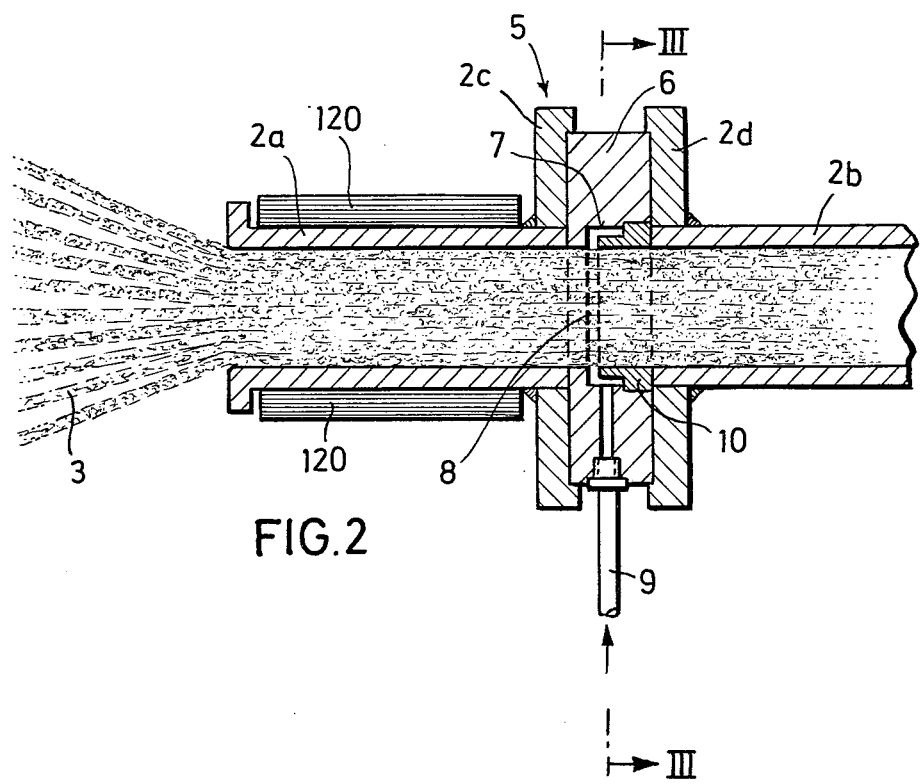
FIG. 2 is a sectional view showing the injection means in the molding duct means.
Figure 3:
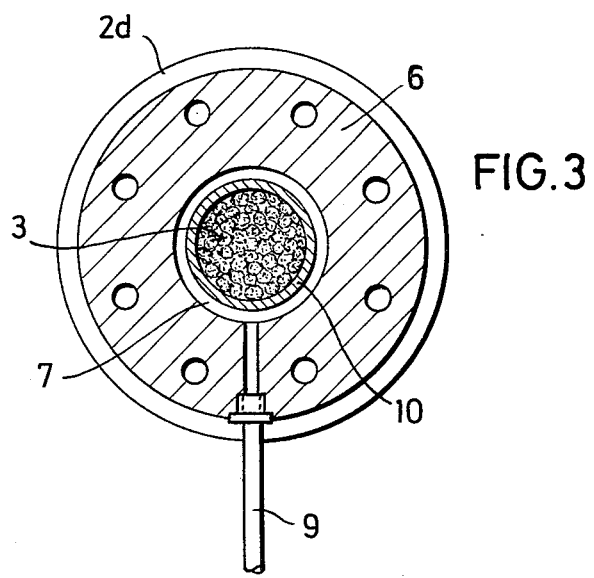
FIG. 3 is a cross-sectional view taken on the line III—III of FIG. 2.

In FIG. 1, an apparatus 1 is shown for the continuous production of fiber reinforced profile members. Although this apparatus can operate in any position from vertical to horizontal, it is shown in the horizontal working direction. The reinforcing fiber material 3 consisting of glass fibers or the like, is provided, e.g. in the form of continuous rovings, woven webs, fabric, fleeces or the like. This material 3 is fed in the dry state directly to the shaped molding duct or passage 2. The molding duct includes an inlet section 2a and an outlet section 2b with a passage extending therethrough. This passage, especially in the outlet section, is shaped to conform with the desired configuration of the finished profile member. Rovings 3 are drawn from a plurality of fiber supply spools 4a arranged on a spool frame 4. The rovings 3 are passed through a guide means consisting of individual eyes or loops 3a arranged in proper spaced relationship to conform with the desired specific location for each roving to be embedded in the final profile member. The rovings 3 are fed into the shaped molding duct 2 at a rate which is compatible and coordinated with the other molding elements. These rovings are spatially arranged prior to their entrance into the molding duct 2 so that a minimum of rearrangement is possible within the duct 2.

The number of rovings entering the shaping duct is sufficiently great so that the reinforcement inlay is compressed, while between the individual fibers of the rovings, spaces are left which are subsequently filled with liquid resin. The rovings as such are fed as a dense packing into the shaping duct where the fibers are in mutual contact. Though they are in disorder and partly crimped, basically, they are aligned in the transport direction.

An injection means 5 is provided between the inlet section 2a and outlet section 2b of the shaped molding duct 2. In this embodiment the inlet section 2a of the duct 2 is approximately one-third of the overall length of the duct 2. A replaceable insert or intermediate member 6 forms an annular passage 7 for the injection means 5. The insert 6 is held clamped between flanges 2c and 2d of the molding duct 2. The annular passage 7 is positioned within the insert 6 and is arranged around the circumference of the opening in conjunction with an annular slot or nozzle 8. Resin passes through the annular passage 7 and flows from the annular nozzle 8 in an even fashion around the entire circumference of the opening. A conduit 9 is connected to the annular passage 7. The sides of the annular passage 7 and the gap or nozzle 8 can be varied by replacing the appropriately shaped insert member 10.

The inlet section 2a of the molding duct is arranged with a heating means 120 for preheating the dry fibers of the rovings 3 as they pass through the inlet section 2a. It is to be understood that this heating means can be of any type and arranged as part of the inlet section or positioned to surround and heat the inlet section as well as the reinforcing fibers. This preheating causes the sizing adhering to the fibers of the reinforcement inlay to soften and become tacky. The fibers are caused to adhere to each other at their points of contact forming an irregular fixed grid structure with hollow spaces which are subsequently filled during the injection of resin. Displacement of the fibers with respect to each other is prevented during the injection of resin into the molding duct.

If preheating, as provided by the invention, were omitted, there is the risk that the relative positions of the individual rovings in the shaping duct will be changed by the liquid injection of the resin. The injection of the resin has the effect of a lubricant, and thus, in spite of the dense packing of the rovings, the mutual position of the rovings could be changed.

The reinforcement inlay glass fiber rovings are coated with a sizing such as thermoplastic resin. A preferred resin is vinyl acetate which has a melting point of about 71° C. The preheating step is carried out in the range of 70° to 85° C with vinyl acetate sizing.

Examples of commercially available sized spun glass rovings are type EC9-1440V4 K73 and EC9-2280V4 K73 which are manufactured by Gewetex Textilglass GmbH, Duesseldorf, Germany. These rovings have a sizing of vinyl acetate.

A preferred injection resin is an unsaturated polyester resin having medium to high reactivity and containing about 35% styrene. The reaction temperature of this resin is slightly above the preheating temperature of 70° – 85° C.

The area of the molding duct 2 associated with the inlet section 2a is called the preheating zone while the area associated with the injection means is known as the wetting zone. That portion of the outlet section 2b of the molding duct 2 which is associated with a heating means 11 is known as the gelling or hardening zone.

A cooling means 2e is provided between the wetting zone and the hardening zone. This cooling means 2e is provided around or in a portion of the outlet section 2b and is positioned immediately downstream or adjacent to the injection means 5. A cooling medium flows through the cooling means to obtain the desired heat transfer. The flow rate of this cooling medium is controlled by a temperature sensing device (not shown) to raise or lower the flow rate of the medium to obtain the desired temperature in the molding resin prior to reaching the hardening zone.

The heating means 11, positioned either in or around the outlet section 2b of the molding duct 2, is provided to elevate and control the temperature of the reinforced resin member to accelerate and effect the hardening of the thermosetting resin.

The cooling means 2e and the heating means 11 are necessary to prevent the temperature of the resin in the molding duct outlet section 2b from substantially exceeding the polymerization temperature of the resin. Because most resin molding is an exothermic process, without the above temperature control there would be a danger of the temperature increasing and possibly resulting in the "combustion phenomena" sometimes experienced in synthetic resins.

Figure 4:
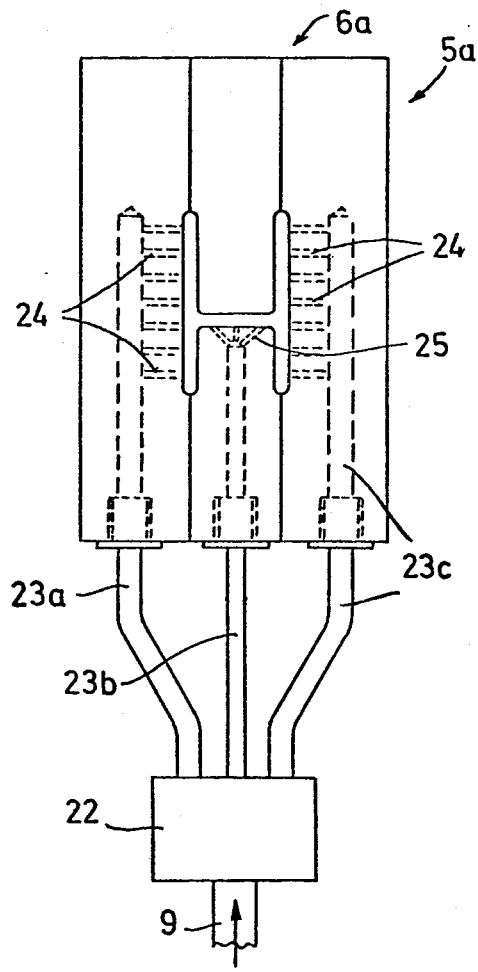
FIG. 4 shows a diagrammatic view of another injection means for H-shaped profile members shown in the same plane as FIG. 3.

In FIG. 4, another embodiment of the injection means 5a is shown wherein the insert element 6a defines an H-shaped passage in order to produce a reinforced H-shaped member. The pressure conduit 9 for injection of the resin is branched in a distributor element 22 and then into several branch pipes 23a, 23b, 23c leading to the insert element 6a. The insert element 6a is composed of several members having a plurality of passgeways 24, 25 providing a sufficient flow of resin to the H-shaped passage.

As shown in FIG. 1, a resin storage reservoir 13 is connected by pipe 14 to pump 12 which in turn is connected to the injection means 5 by pressure conduit 9. The pump 12 pressurizes the resin and moves it to the injection means 5. A continuous or through-flow heater 15 can be inserted in the conduit 9 between the pump 12 and the injection means 5. This heater 15 is used to preheat the resin to be injected into the shaped molding duct to a temperature which is near the hardening temperature for the specific resin.

If desired, the pressure pump 12 and reservoir 13 can be replaced by a pressurized container into which the resin is introduced. By maintaining a constant pressure of compressed air or other pressurized fluid on the surface of the resin, the resin will be caused to flow to the molding duct and injected under a constant pressure condition.

It is to be understood that the injection pressure is not critical and can fluctuate within a wide range depending upon the composition and physical characteristics of the resin. It is only necessary to provide a pressure which is sufficient for producing a uniform wetting of the reinforcing fibers 3. If desired, the resin can be permitted to flow to the injection means 5 by gravity alone for injection into the opening.

The completed reinforced, hardened resin profile member 16 is withdrawn from the shaped molding duct 2 by means of a pair of withdrawal devices 17, only one of which is shown. The withdrawal devices operate alternately in a push-pull arrangement gripping the profile member 16 during each pull stroke so that a continuous withdrawal force on the member is guaranteed.

After the profile member 16 has reached a sufficient length, the desired portion is severed from the extending column by means of a saw mechanism 18. The saw mechanism 18 can be in a fixed position or movably arranged in order to move with the profile member as it is withdrawn from the molding duct 2. Clamping jaws 19 are provided for holding the profile member during the cutting operation. The individual profile lengths are collected on a table 20 which may include rollers to aid in movement of the members across the surface of the table 20. The members are then transported by means of a stripper device 21 to any desired location.

Since the saw cut requires only a few seconds or less, usually a fixed saw arrangement is sufficient for this operation. It is possible to stop the movement of the profile member 16 during the cutting operation, if desired, thus permitting the fixed saw to operate.

The above described apparatus can be operated in any position desired whether it be horizontal or vertical or any angle in between. The vertical operation presents less problems with respect to the molding process of the invention while the horizontal operation has advantages with respect to the handling of the finished product. Due to the injection method of wetting the reinforcing fiber material, the operation of this apparatus is relatively independent of the angular position.

When in operation, the apparatus 1 continuously produces reinforced profile members by the coordination of the rate of withdrawal of the hardened member 16 from the shaped duct 2, the rate of injection resin into the duct 2, and the rate of feeding the reinforcing material into the duct inlet. The preheating of the dry reinforcing fibers and the resin prior to their introduction into the wetting zone permits a morer complete wetting of the individual fibers and the release and removal of air and gases from the wetting zone during the molding operation. The rate of material ingress is controlled to force the resin to move slightly upstream along the fibers, thus causing a scrubbing action aiding in the removal of trapped gas. In addition, the preheating of the dry reinforcing fibers obtains a preliminary fixing of the relative position of the fibers due to the limited curing affect on the sizing accompanying the thermal heating action. The flow rate of the resin is maintained so that the resin moves towards the inlet section 2a of the duct 2 and then reverses and flows towards the outlet 2b as the hardened profile member 16 is withdrawn. With the cooling means 2e surrounding the outlet section 2b of the molding duct 2, the length of the hardening zone can be shortened or the operating speed of the molding process can be increased. Further changes in the operating speed can be effected by adding additional length to the hardening zone by extending the outlet section 2b.

Further advantages in the operation of the apparatus of this invention can be obtained by the use of low-shrinking resins in the molding process. Only a small reduction in the overall cross-section of the finished product occurs with these resins permitting the dimensions to be held to a desirable close tolerance. These resins still permit the hardened profile member to pull back slightly from the walls of the molding duct, thus assuring that the withdrawal tension will be maintained within a reasonable range. Linear shrinkage of the resin should not exceed 1.5 percent; while below 1 percent, and preferably 0.1 percent is desirable. It is to be understood that any type of low-shrinking thermal setting resin can be used with this apparatus but those resins which are based on unsaturated, styrene-containing polyester resins which contain certain portions of thermoplastic resins, and low-shrinking epoxide resins are preferable. These resins are found to produce finished members with relatively few shrinkage marks and thus a smoother outer surface resulting in a more pleasing finished appearance. These surfaces can also be lacquered or coated without pretreatment of the member, if desired.

As a further feature to aid in the continuous molding of the profile members, it has been found that peroxides which are stable at temperatures close to the hardening temperatures of the resin may be mixed with the resin prior to injection and have the added advantage of greatly reducing the viscosity of the injected resin. Peroxides such as tertiary butyl hydroperoxide or derivatives thereof are satisfactory for this use. These peroxides produce only a slight degree of polymerization up to temperatures which are only slightly below the hardening temperatures of the resin. This characteristic is desirable so that the danger of a premature hardening of the resin before the resin reaches the hardening zone of the molding duct is avoided. The peroxide mixed resin can usually be preheated to a higher temperature; thus additional lowering of the viscosity is obtained. The lower viscosity permits a more rapid and complete wetting of the reinforcing fibers. It is thus possible to increase the molding rate without the usual problems of unwetted reinforcing fibers and the inclusion of air or gas bubbles in the hardened member. An additional advantage is obtained in that the length of the molding duct does not have to be increased as would be normal with an increase in molding rate. A further advantage is that a higher proportion of reinforcing fibers to resin can be utilized because of the lowered resin viscosity.

Figure 5:
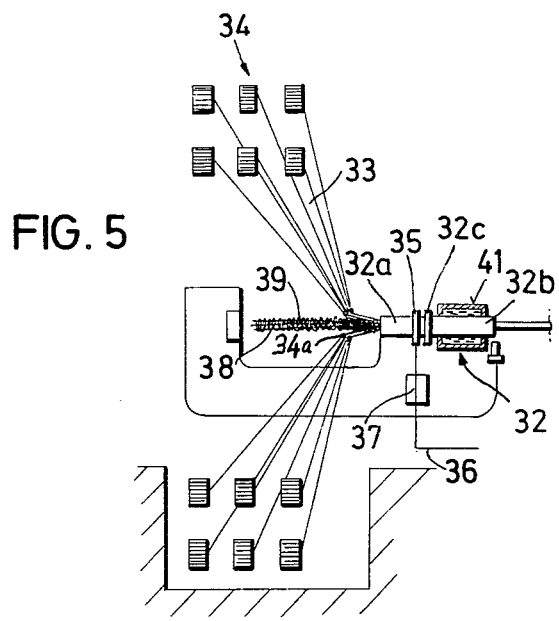
FIG. 5 shows a partial diagrammatic view of another apparatus of this invention showing the shaped molding means and the feed means.

In FIG. 5, another embodiment of this invention is shown. In this embodiment the apparatus is designed so that reinforced longitudinal openings may be positioned within the profile member. It is well known that an extruded profile with only axial fiber reinforcement tends to split with the application of minor radial forces, since only the strength of the resin between the fiber lengths is effective. The use of woven fabrics or mats tends to improve this condition but further reinforcing is necessary in the areas of concentrated stress around attachment holes or openings. This is especially true where an expandable fastener is to be inserted in the opening for assembling a plurality of profile members into a usable unit.

In this embodiment additional reinforcing coils or windings forming a closed profile are incorporated into the mold in the desired location with respect to the cross-section of the member.

The reinforcing fiber material 33 in the form of continuous lengths, fabric webs or fiber fleeces is removed from individual spools on the spool frame 34 and fed directly into the molding duct 32. Similar to above, an arrangement of guidance loops or eyes 34a is precisely positioned in front of the inlet section of the molding duct 32 to position and guide the material with respect to the cross-section of the duct. The molding duct 32 includes the inlet section 32a and the outlet section 32b. The length of the inlet section 32a is approximately one-third of the entire length of the duct 32. In a manner similar to the embodiment of FIG. 1, the reinforcing fibers are preheated in their dry state as they are fed through the inlet section 32a by heating means. The resin is forced through the pressure conduit 36 to the injection section 35 which is positioned between the inlet and outlet sections of the molding duct 32. The resin can be preheated by the use of a through-flow type heater 37 positioned in the pressure conduit 36 immediately upstream of the injection section 35. The injection section 35 is designed so that the resin penetrates into the molding duct uniformly from all sides of the cross-section. For this purpose the injection section 35 has arranged within it a passageway having the predetermined configuration of the member to be produced. The outlet section 32b of the molding duct 32 is downstream of the injection section 35 and includes a cooler 32c and a heating device 41 further downstream designed for hardening the resin. It is to be understood that this operation can be performed either in the vertical or horizontal direction or at an inclination therebetween as desired.

In addition to the normal guide means provided in the previous embodiment, further guide loops (not shown) are provided in front of the mouth of the inlet section 32a and through which continuous length of reinforcing fibers 38 are fed directly into the molding duct 32. These lengths 38 are arranged in a circular configuration having the desired diameter of the longitudinal openings in the profile member 16. These circularly arranged continuous lengths 38 are precisely positioned with respect to the cross-section of the molding duct 32 and the finished profile member 16. Additional reinforcing in the form of helical windings or coils 39 are wrapped around the fiber lengths 38 to form the closed profile of the longitudinal opening. As the continuous lengths 38 are drawn into the molding duct 32, the coils 39 are also introduced into the mold duct. Hence, with the production of the profile member 16, it is possible to establish the exact position of the coil 39 and the longitudinal opening within the finished profile member. By close winding of the helical fibers 39 and controlling the rate of the molding operation, the hollow longitudinal opening is produced without the intrusion of resin within the opening.

Figure 6:
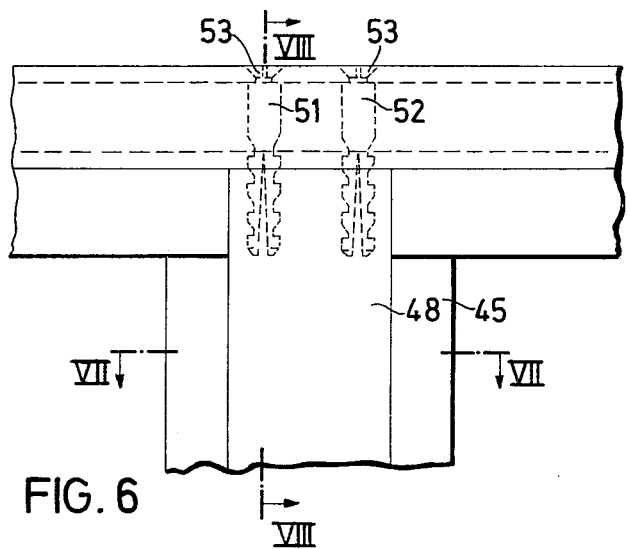
FIG. 6 shows a side view of two profile members produced by this invention and a method of assembling these members.
Figure 8:
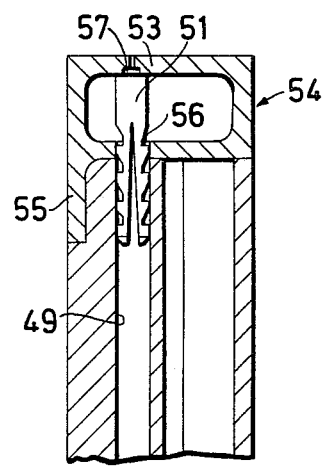
FIGS. 7 and 8 show sectional views of the assembled members shown in FIG. 6 taken along the lines VII—VII and VIII—VIII, respectively.
Figure 7:
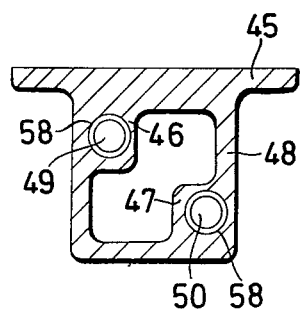

In FIGS. 6 – 8 a typical arrangement is shown wherein two finished profile members are joined together to form a T-shaped unit. The profile member is formed in the shape of a hollow rectangular box member 48 which includes a flange 45 along one side. Two diagonally opposite corners 46, 47 of a rectangular member 48 are made thicker towards the inside direction. The longitudinal openings 49, 50 pass through this thickened portion and thus reinforce the entire profile member. The openings 49, 50 extend longitudinally through the profile member and serve for the reception of expandable fasteners 51, 52 into which screws 53 can be inserted. Attached transversely to the top of the profile member 48 is another reinforced profile member 54 which also consists of a hollow rectangular box arrangement. A flange 55 extends downwardly from one edge of the box member 54. The flange 55 extends directly above the vertically extending flange 45 of the vertical box member 48. The box profile member 54 is formed on its under side with openings 56 which correspond in size to the cylindrical openings 48, 50 so that the expandable fasteners 51, 52 project upwardly, partially into the interior of the hollow profile member 54. The screws 53 are introduced through corresponding openings 57 in the profile member 54 and are threaded into the expandable fasteners 51, 52. With this arrangement, the radial force exerted by the screws 53 and the expandable fasteners 51, 52 against the circumference of the longitudinal openings 49, 50 can be securely restrained. Maximum stress can be retained by these openings to allow the fastening means 51, 52 to securely hold the two-section members 48, 54 in permanent position.

Figure 15:
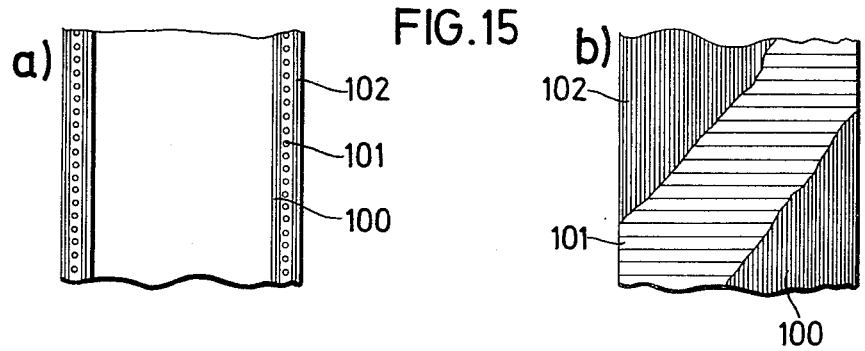
FIGS. 15 – 18 show various cut-away views of winding reinforced layers which can be used with this invention.
Figure 16:
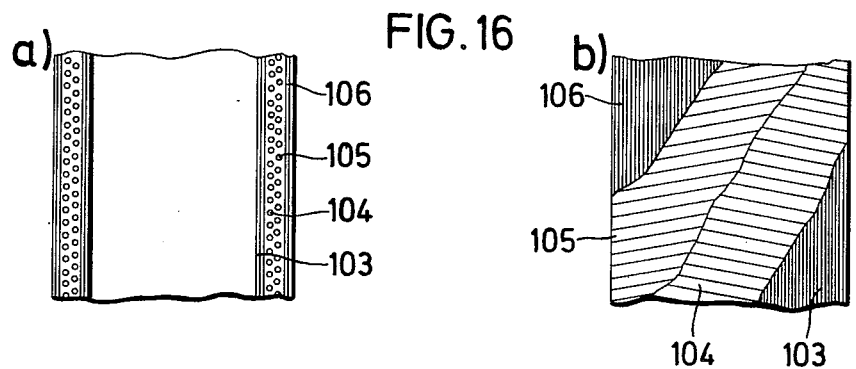
Figure 17:
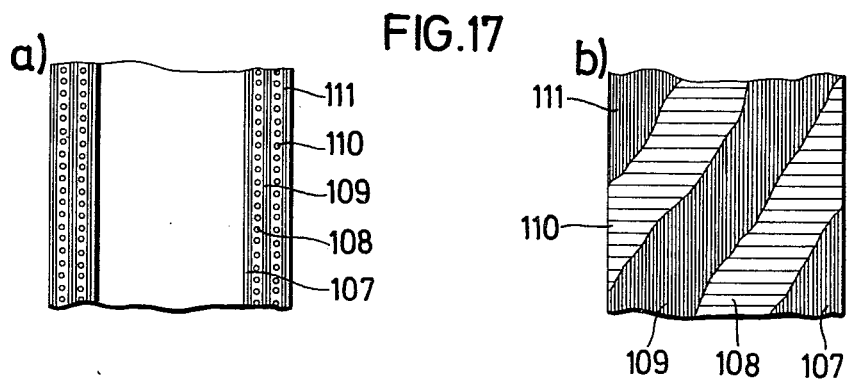
Figure 18:
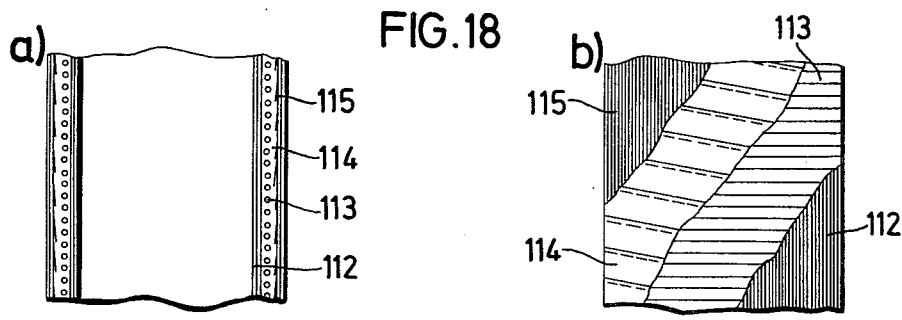

The laminate structure which is obtained near the longitudinal openings in the finished profile member which includes the continuous fiber lengths 34 and 38 and the coils or windings 39 are diagrammatically shown in FIGS. 15a and b. In these figures, the inner fibers 38 are designated 100 with the coil windings 39 as 101 and the outer axially disposed continuous lengths 33 as 102.

Another style of product that can be produced by this invention is shown in FIGS. 9 and 10. In this arrangement a roller blind is formed by the interconnection of the longitudinal edges of strip-type profile members 60. On each strip 60, one longitudinal edge 61 is formed at approximately a right angle to the strip and is thickened in the form of a bead. The other edge 62 is formed having an arcuate extension which engages and surrounds the bead-like thickened portion of the adjacent strip 60. For strength purposes, the roller blind strip is formed in a slightly curved profile in the center section between the longitudinal edges.

When assembling the roller blind or shutter, the strips 60 are cut in equal lengths and are assembled together with their alternate edges 61, 62 interconnected together. Since the sections are interconnected longitudinally, retainers 63 are provided on the ends of the strips 60 and are held in position by screws 64. The screws 64 are threaded into expandable fasteners 65 which are inserted in the longitudinal openings 66 located within the edge portion 61. If desired, the retainer 63 can be fitted with the projecting parts of the expandable fastener 65 which then only requires the insertion of a screw for tightening the retainer 63. The retainer 63 has such a broad bearing surface that it prevents the thickened edge portion 61 from being moved longitudinally out of the edge 62 of the adjacent lined strip member. Separate windings or coil layers are arranged within the resin surrounding the opening 66 in accordance with this invention to produce the sufficient strength necessary for retention of the expanding fastener 65.

In FIG. 11, the construction of a stepladder in accordance with the process of this invention is shown. The rungs or steps 70 and side rails 71 are formed as molded profile sections. It is to be understood that the side rails 71 can be fabricated from other materials such as metal, if desired. The rungs 70 have a substantially flat step surface 72 which can be fluted or roughened on its upper surface so as to provide a necessary non-slip surface. The outer edges 73 of the rungs 70 are bent downwardly to produce a rounded appearance. Extending longitudinally beneath the step surface is an extending bead 74 which includes a longitudinally extending cylindrical opening 75. The longitudinal opening 75 is enclosed with a fiber winding in accordance with this invention which is embedded into the synthetic resin so that the rungs or steps 70 may be attached to the side rails 71 by means of expandable fasteners (not shown) as described above.

Figure 12:
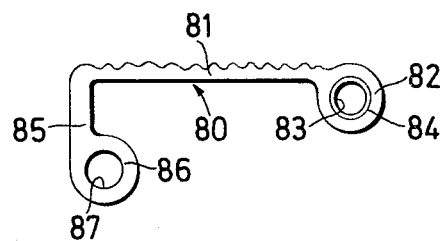
FIG. 12 shows a sectional view taken along the line XII—XII of FIG. 13 showing the rung of a stepladder including two longitudinal openings disposed in the opposite edges of the member.
Figure 13:
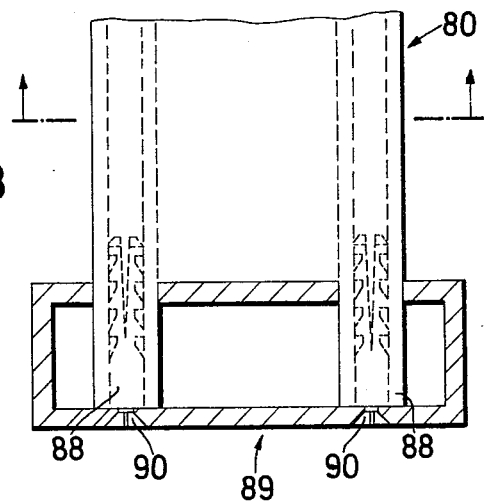
FIG. 13 shows a partial sectional view of an assembly of the stepladder rung and side rail showing expanding fasteners in the longitudinal openings.

The corresponding construction of a staircase or stepladder profile is shown in FIGS. 12 and 13. The profile member 80 has a flat tread surface 81 which is fluted on its upper side and terminates in a bead 82. The bead 82 has a cylindrical longitudinal opening 83 which is surrounded or enclosed by a multi-layer fiber winding 84. On the opposite or front side, the step profile 80 is formed with a downwardly extending leg 85 which is positioned at right angles with the top surface 81 of the profile member 80. The leg 85 terminates in another bead arrangement 86 in which is formed a second longitudinal cylindrical opening 87. The latter opening may also be enclosed or surrounded with a multi-layer fiber winding such as shown at 84 for the insertion of an expandable fastener 88.

The assembly of a staircase step 80 to a side plate 89 is shown in FIG. 13. The side plate 89 has a box-shaped section, into which the beads 82 and 86 project through suitable openings. The beads 82, 86 are attached by means of expandable fasteners 88 and screws 90 on the outside of the side plate 89.

Figure 14:
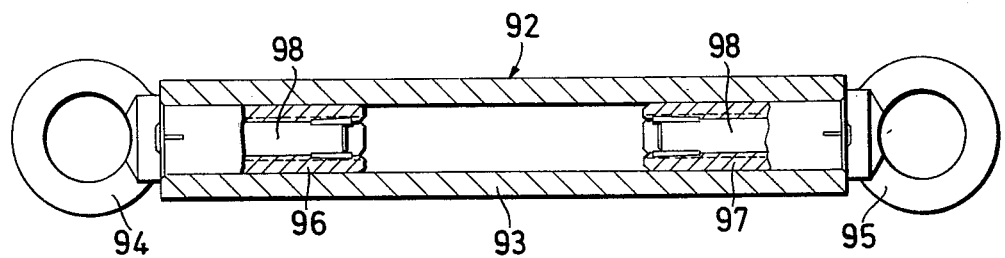
FIG. 14 shows a sectional view of a draw bar formed by this invention.

A further product produced in accordance with this invention is shown in FIG. 14. The draw bar 92 arrangement consists of a tube section 93 to the ends of which are fixedly attached draw hooks or eyes 94, 95. The attachment of the draw hooks 94, 95 is likewise assisted by means of expandable fasteners 96, 97 which are inserted from each side into the tube section 93. The draw hooks 94, 95 are provided with threaded studs 98 which can be directly screwed into the expandable fasteners 96, 97. The tube section 93 is a laminated structure formed as a multi-layer fiber winding, the fibers being so distributed that the layers of the reinforcing material closest to the inside wall of the tube are more dense than those near the outside wall. The result achieved is that the circumferential stresses produced by the radial forces exerted by the fasteners are absorbed primarily by those fibers closest to the point of force application.

The product examples described herein are presented only to illustrate several products which may be produced by the process of this invention. It is not intended that this process is limited in any way to those products described herein but any product which may be produced by the process of this invention is considered within the purview of this invention. It is readily apparent that numerous products are possible through the use of the processes and apparatus as described.

FIGS. 15a – 18b show examples of reinforcing windings or coils in sectional and cut-away views respectively that can be formed. These laminated structures can be used in the formation of the closed profile surrounding the longitudinal openings of the member or in the case of a tubular member, can form the basis for the reinforcement structure of the member itself. The laminated structure in the region of the small longitudinal opening cross-section differs considerably from the laminated structure of the overall profile member cross-section. The number and formation of the convolutions surrounding the openings depend on the load to be expected from the point of attachment. Normally, the laminated structure is characterized from the inside of the opening towards the outside by the numerical ratio 1:1:2. In other words, this means that about 25 percent of the reinforcing material represented by the middle factor in the ratio is wrapped as coils or convolutions around the circumference of the opening. Depending upon the stress requirements, this proportion can be increased to 50 percent and more if desired. The remaining laminated structure depends on the overall stress-function requirements of the profile member.

In FIGS. 15a and b, mentioned previously in connection with the apparatus of FIG. 5, an inner axially extending surface layer 100 is arranged inside a strictly circumferentially wound coil or convolution 101. The convolution 101 is in turn covered by an axially extending outer covering layer 102. While a diagrammatic cross-sectional view can be seen in FIG. 15a, the same laminated structure is shown in 15b with each layer progressively cut away. The straight, solid lines show in each case the directional arrangement of the fibers, while the diagonally extending irregular lines represent the cut-away edges of each respective fiber layer.

FIGS. 16a and b show a reinforcing winding or coil, in which convolutions 104, 105 are arranged one over the other and between the two axially extending inner and outer layers 103, 104. The two convolution layers are wound so as to produce a different angular direction with respect to each other. In addition, the outer convolution 105 is wound in a clockwise direction, while the inner convolution 104 is wound in a counter-clockwise direction. Naturally, it is to be understood that these directions can be reversed if desired.

In FIGS. 17a and b, another laminated structure is presented wherein an inner axially arranged layer 107 is wrapped by a circumferentially wound coil 108 and this coil in turn is overlaid by an axially extending intermediate layer 109. A second coil winding 110 is wound in the same winding direction as the first winding 108. An additional axially extending layer 111 serves as an outer reinforcing cover.

The above laminated structures have been described using fiber material. It is to be understood that it is possible to use materials in other forms, such as strips, if desired. Such a use is illustrated in FIGS. 18a and b in which an inner axially extending fiber layer 112 and a circumferentially wound coil 113 have arranged thereon an intermediate layer 114 which consists of a fiber band or strip wound in a spiral or helical form. Surrounding this layer is an outer axially extending covering layer 115.

The laminated structure arrangements described herein are to be understood as only an example of the arrangements that are possible to be used with this invention. Numerous other structural forms and arrangements are possible and are considered within the intent of this disclosure.

While a method and apparatus for the continuous molding of reinforced resin profile members has been shown and described in detail, it is obvious that this invention is not to be construed as being limited to the exact form disclosed and that changes in detail and construction may be made therein within the scope of the invention, without departing from the spirit thereof.

I claim:

1. An apparatus for the continuous molding of a structural profile member of predetermined constant cross-sectional shape and having embedded therein a plurality of continuous length, substantially parallel reinforcing elements selected from at least one member of the group consisting of fibrous rovings and fabric webs, said apparatus comprising in combination:
    a. a longitudinally extending molding duct means defining a single molding passage with an inlet end and an outlet end, said passage, over substantially its entire length and including said inlet and outlet ends, having the predetermined cross-sectional shape of said cross-sectional shape of the profile member to be formed, said molding duct means comprising a preheat zone adjacent said inlet end and a wetting zone downstream of said preheat zone;
    b. means for continuously feeding a plurality of continuous length reinforcing elements selected from at least one member of the group consisting of fibrous rovings and fabric webs and having a heat softenable sizing material adhering thereto into said duct means at said inlet end, said feeding means including guide means for predeterminately positioning said elements with respect to each other and said molding passage as they are fed through said inlet end;
    c. said molding passage at said preheat zone being adapted to compress said reinforcing elements into mutual contact, and said preheat zone including heating means for heating said reinforcing elements to cause said sizing material to become tacky and bond said compressed reinforcing elements together at their points of contact to form an irregular grid structure filled with hollow spaces;
    d. said wetting zone including means for injecting resin into said molding passage to fill said hollow spaces and form said profile member with said reinforcing elements embedded therein; and
    e. withdrawal means for continuously drawing the reinforced resin profile member from the outlet end of said molding duct means.

2. An apparatus for the continuous molding of profile members as defined in Claim 1 wherein the injection means includes reservoir means for storing the hardenable resin, conduit means connecting the reservoir with the annular passage, and a pressurizing means for moving the resin from the reservoir means to the annular passage.

3. An apparatus for the continuous molding of profile members as defined in Claim 2 wherein the injection means includes flow-through heater means arranged in the conduit means between the annular passage and pressurizing means whereby the resin is heated prior to being injected into the molding passage.

4. An apparatus for the continuous molding of profile members as defined in Claim 1 wherein the injection means includes heater means for heating the resin prior to injection into the molding passage, said molding duct means further comprising a hardening zone downstream of said wetting zone, said hardening zone including a heater means for heating the member before withdrawal from the molding duct means in order to harden the resin.

5. An apparatus for the continuous molding of a profile member as defined in Claim 1 wherein said guide means comprises a plurality of loops at predetermined spaced locations and each adapted to guide a continuous length of reinforcing element.

6. An apparatus for the continuous molding of a profile member as defined in claim 1 wherein said means for feeding said elements is arranged to feed said elements along a plurality of paths generally transverse to the direction of said passage towards said guide means, said guide means being adapted to guide said elements in converging fashion into said passage.

7. An apparatus for the continuous molding of profile members as defined in claim 6 wherein said guide means comprises a plurality of loops at predetermined spaced locations and each adapted to guide a continuous length of reinforcing element.

8. An apparatus for the continuous molding of profile members as defined in claim 1 wherein said injection means comprises an annular passage transverse to and communicating with said molding passage about the perimeter thereof for evenly injecting said resin about the entire perimeter of said molding passage.

9. An apparatus for the continuous molding of profile members as defined in claim 1 wherein said heating means is adapted to heat said reinforcing elements to a temperature between about 70° and 85° C.

* * * * *